Aug. 16, 1932.  E. R. KUHLS  1,871,892
ENGINE STARTER
Filed July 31, 1929
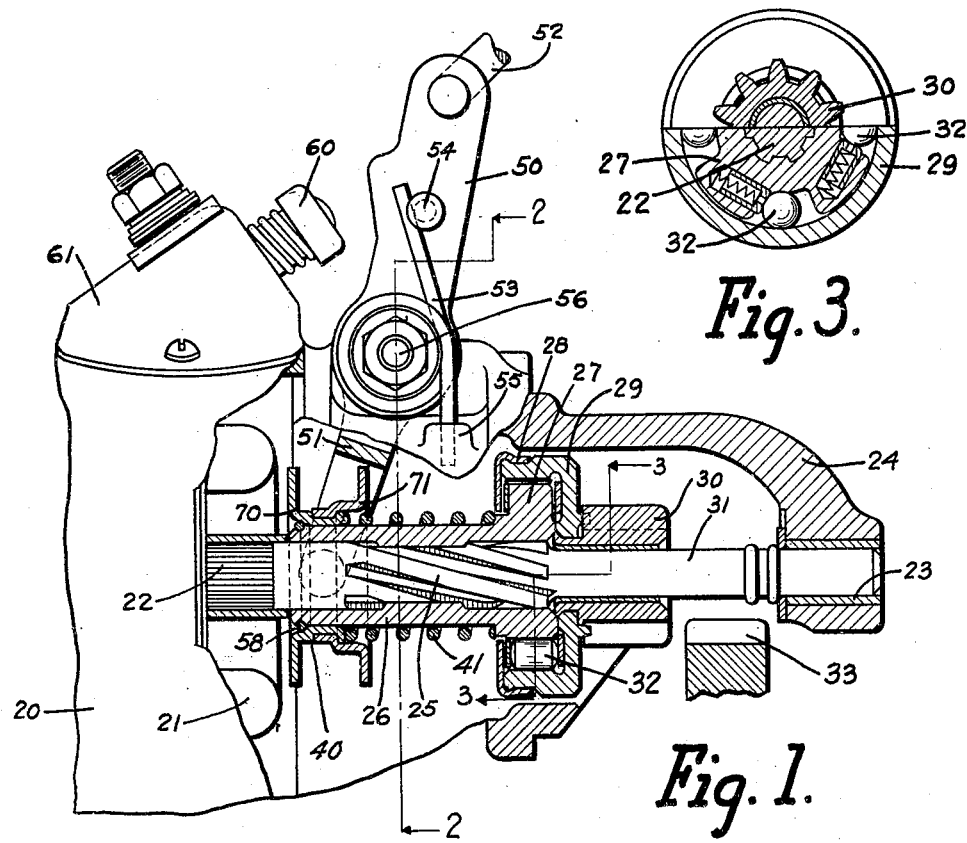
Fig. 3.
Fig. 1.
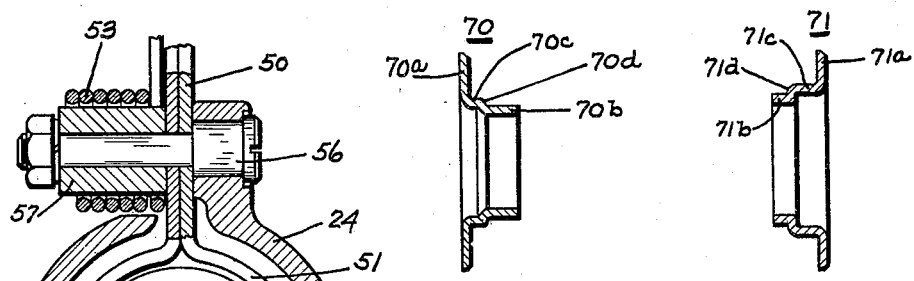
Fig. 4.  Fig. 5.
Fig. 2.
Inventor
Ernest R. Kuhls
By
Spencer, Hardman and Zehr
Attorneys Patented Aug. 16, 1932

1,871,892

UNITED STATES PATENT OFFICE

ERNEST R. KUHLS, OF DAYTON, OHIO, ASSIGNOR TO DELCO-REMY CORPORATION, OF ANDERSON, INDIANA, A CORPORATION OF DELAWARE

ENGINE STARTER

Application filed July 31, 1929. Serial No. 382,538.

This invention relates to a mechanism for shifting a rotatable body along its axis of rotation, and more particularly to improvements in the manufacture of a shifting collar slidable axially along a shaft which supports it, and having flanges receiving studs or the like extending from arms of a bifurcated shifting lever.

Heretofore it has been the practice to manufacture shifting collars by turning them from solid bars of stock in order to provide a cylindrical tubular body having an annular flange at each of its ends. It is particularly an object of this invention to provide a shifting collar which can be manufactured from two formed sheet metal parts, each of which is shaped so as to provide a cylindrical flange and an annular flange extending in a plane at right angles to the axis of the cylindrical flange. The two parts of the collar are secured together by passing the cylindrical flange of lesser diameter through the cylindrical flange of greater diameter and by riveting the former against the part carrying the latter flange so as to retain both parts of the collar in permanent assembled relation.

Further objects and advantages of the present invention will be apparent from the following description, reference being had to the accompanying drawing wherein a preferred embodiment of one form of the present invention is clearly shown.

In the drawing:

Fig. 1 is a fragmentary side view, partly in section, of an engine starting apparatus embodying the present invention.

Fig. 2 is a sectional view taken along the line 2—2 of Fig. 1.

Fig. 3 is a detail sectional view taken along the line 3—3 of Fig. 2.

Figs. 4 and 5 are detail sectional views of the two members adapted to be secured together to form the collar of the gear shifting mechanism.

Referring to the drawing, the numeral 20 designates an electric motor supported upon the frame of an engine, not shown, said motor having an armature 21 provided with a shaft 22, one end of which is supported within the frame of the motor, the other end in a bearing 23 carried in the gear housing 24. The gear housing is secured to the frame of the motor 20 in any suitable manner. The shaft 22 is provided with a plurality of splines 25. A tubular member 26 supported upon the shaft 22 has provisions for operatively engaging the splines 25 of the shaft so that, when the tubular member is shifted longitudinally on the shaft, it will rotate relative to said shaft.

A pinion 30 is slidably supported upon the reduced portion 31 of the shaft 22. Pinion 30 is connected with the tubular member 26 by an overrunning clutch which positively connects the tubular member 26 with the pinion 30 when said member is being driven by the motor shaft 22 for cranking purposes. If, after the engine has become self operating, the pinion 30 is left in mesh with the engine gear 33, said gear will drive the pinion at a greater R. P. M. than does the motor shaft 22 so that under these conditions the overrunning clutch permits relative rotation between the pinion 30 and tubular member 26.

The tubular member 26 has a head 27 adapted to be received by the clutch shell 29, which is operatively connected with the pinion 30. Head 27 has a plurality of recesses forming chambers within the shell 29, each chamber having a roller 32 therein. The contour of the respective recesses is such that when the member 26 is rotated to crank the engine, rollers 32 will grip shell 29 and cause it to rotate therewith. If the shell be rotated at a greater R. P. M. than that of the starting motor the rollers will permit said shell to rotate relative to the head 27. A cover cap 28 retains the rollers 32 in proper position within the clutch.

The starting apparatus is provided with means for shifting the pinion 30 into and out of engagement with the engine gear 33. This means comprises a spool-shaped shifting collar 40 slidably supported upon the tubular member 26. A spring 41 is interposed between the collar 40 and the clutch-cam 27 so that as the collar 40 is moved along the tubular member 26 toward said clutch-cam, the spring 41 will cause the tubular member 26, the clutch, and pinion 30 to be moved slidably along the shaft 22, the splines 25 on said shaft rotating said parts relative to said shaft as they are moved along said shaft, thereby facilitating enmeshment of the pinion 30 with the engine gear 33.

The gear housing 24 has a stud 56 which pivotally supports the actuating lever 50, one end of which is provided with a yoke portion 51 engaging the collar 40, the other end of which has a rod 52 connected therewith. Rod 52 is connected with any suitable operating lever, not shown. A spring 53 surrounding a sleeve 57 on stud 56 has one end engaging a pin 54 supported by the lever 50, the other end engaging an abutment block 55 provided by the gear housing 24. This spring normally urges the lever 50 clockwise so as to move the collar 40 away from the clutch. A locking ring 58 provided in an annular groove adjacent the outer end of the tubular member 26 limits this movement of the collar.

Operation of the lever 50 in a counterclockwise direction for engine starting purposes will first move the collar 40 toward the right as regards Fig. 1, said collar exerting a push on spring 41, which, as has been explained heretofore, will move the tubular member 26, its clutch assembly and the pinion 30 toward the engine gear 33. If the teeth of the pinion 30 mesh with the teeth of the engine gear 33, lever 50 will, after such meshing of the teeth, engage the switch plunger 60 supported on the switch housing 61, said switch plunger 60, after being moved a proper distance into said housing, closing the electrical circuit through the starting motor 20, causing it to rotate, and thus the pinion 30 will be rotated to crank the engine. In case the ends of the pinion teeth collide with the ends of the teeth of the engine gear 33 before meshing, continued movement of the lever in a counterclockwise direction is permitted, said continued movement compressing the spring 40. As soon as the electrical circuit is closed by the switch plunger 60, the motor will start to operate, turning the pinion 30 relative to the engine gear 33, thus causing the teeth of the pinion to register with the space between the teeth of the engine gear 33, the spring 41 then urging the pinion quickly to move into mesh with the engine gear so that these gears will be substantially engaged before the motor can attain its maximum speed, thus substantially reducing the danger of damage to the teeth of the pinion and gear.

The feature of the present invention resides in the shifting collar 40. As shown in Fig. 1, this collar comprises two members 70 and 71. Member 70 is clearly illustrated in Fig. 4, and member 71 in Fig. 5. Member 70 is shown to be in the form of a ring 70a having a cylindrical extension coaxially thereof, said cylindrical extension comprising two parts 70b and 70c, the former being of lesser diameter than the latter. These two diameter parts 70b and 70c form a shoulder 70d in the cylindrical extension of this member.

The member 71 in Fig. 5 comprises a ring-shaped portion 71a, having a cylindrical extension coaxially thereof, which comprises a part 71b of lesser diameter than another part 71c. These two parts form a shoulder 71d on the cylindrical extension of member 71. The part 71b of the member 71 is of greater diameter than the part 70b of the part 70, so that the part 71b is adapted to fit upon and telescopically engage the part 70b. When part 71 is placed upon part 70 so that its part 71b telescopically engages the part 70b, and the outer edge of part 71b engages shoulder 70d in member 70, the end of the part 70b will extend beyond the inner edge of shoulder portion 71d on the member 71. The inner end of 70b is now spun outwardly so that it will grippingly engage said inner edge of shoulder 71d, thus members 70 and 71 will be interlocked as shown in Fig. 1. The part 70b is adapted slidably to fit over the tubular member 26. Due to the larger diameter portion 70c and 71c of the cylindrical extensions of members 70 and 71, annular pockets will be formed by the collar 40 about the tubular member 26. The end thrust or locking ring 56 enters the one pocket to stop endwise movement of the collar 40 when the lever 50 is operated to move collar 40 into normal inoperative position, the spring 41 having its one end seated within the other pocket formed by collar 40, said pocket acting as a retainer for this end of said spring.

From the aforegoing it may be seen that collar 40 is spool-shaped, made up of two members formed from sheet metal, the cylindrical extensions of said members cooperating to form the tubular body portion of the collar 40, the ring-shaped sides of said members designated by the numerals 70a and 71a forming the spaced flanges of said collar.

The collar as shown is formed of sheet metal by simple punching operations, thus maintaining the cost of commercial production of this device at a substantial minimum, still retaining all of the merits of a collar that is integrally made.

While the form of embodiment of the present invention as herein disclosed, constitutes a preferred form, it is to be understood that other forms might be adopted, all coming within the scope of the claims which follow.

What is claimed is as follows:

1. A collar having a tubular portion of substantial length adapted to slide along a cylindrical body, and comprising two metal members formed of sheet metal of substantially uniform thickness, each member having a cylindrical portion one part of which is of a greater diameter than the other, the smaller cylindrical portion of the one member telescopically engaging the smaller cylindrical portion of the other, said members each having an outwardly extending, annular flange at its outer end, the cylindrical portion of the smallest internal diameter providing a bearing for guiding the collar upon the cylindrical body.

2. A collar having a tubular portion of substantial length adapted to slide along a cylindrical body, and comprising two metal members formed of sheet metal of substantially uniform thickness, each member having a cylindrical portion one part of which is of a greater diameter than the other, the smaller cylindrical portion of the one member telescopically engaging the smaller cylindrical portion of the other, said last mentioned smaller portion having its end crimped outwardly against the shoulder formed by the two diametered cylindrical portions of the other member whereby said two members are secured together, each member having an outwardly extending, annular flange at the outer end, the cylindrical portion of smallest internal diameter providing a bearing for guiding the collar along a cylindrical body.

3. A collar having a tubular portion of substantial length adapted to slide along a cylindrical body, and comprising two metal members formed of sheet metal of substantially uniform thickness, each member having a cylindrical portion one part of which is of a greater diameter than the other, forming an annular shoulder in each cylindrical portion, the smaller cylindrical portion of the one member fitting upon and telescopically engaging the smaller cylindrical portion of the other member, the shoulder of the surrounded member being engaged by the inner edge of the surrounding member, and the inner edge of said surrounded member being spun into gripping engagement with the shoulder formed in the cylindrical portion of the surrounding member to secure the two members together, said members each having an outwardly extending, annular flange at the outer end the inner cylindrical surface of the surrounded member providing a bearing for guiding the collar upon a cylindrical body.

4. A spool-shaped collar adapted to move along a shaft, comprising in combination; a ring-shaped member having a tubular portion extending coaxially therefrom; said tubular portion comprising two parts of different diameter; a second ring-shaped member having a tubular extension coaxially thereof of different diameters, the smaller diameter of which telescopically fits about the smaller diameter tubular portion of the other member; and a flange at the end of the surrounded tubular portion, engaging the surrounding tubular portion to interlock the members, the surrounded tubular portion providing a bearing for guiding the collar along a shaft.

In testimony whereof I hereto affix my signature.

ERNEST R. KUHLS.